United States Patent
Shape et al.

(10) Patent No.: US 8,739,442 B2
(45) Date of Patent: Jun. 3, 2014

(54) AUTO PHOTO CADDY

(71) Applicants: Mike Shape, Farmington, MN (US); Laura Arleth, Farmington, MN (US)

(72) Inventors: Mike Shape, Farmington, MN (US); Laura Arleth, Farmington, MN (US)

( * ) Notice: Subject to any disclaimer, the term of this patent is extended or adjusted under 35 U.S.C. 154(b) by 63 days.

(21) Appl. No.: 13/724,947

(22) Filed: Dec. 21, 2012

(65) Prior Publication Data

US 2013/0111793 A1 May 9, 2013

Related U.S. Application Data

(63) Continuation-in-part of application No. 13/087,065, filed on Apr. 14, 2011, now abandoned.

(60) Provisional application No. 61/324,394, filed on Apr. 15, 2010.

(51) Int. Cl.
*A47G 1/06* (2006.01)

(52) U.S. Cl.
USPC ............... 40/590; 224/312; 40/737; 296/97.6

(58) Field of Classification Search
USPC ......... 296/152, 97.1, 97.6–97.8; 40/643, 644, 40/592, 593, 718, 722, 724
See application file for complete search history.

(56) References Cited

U.S. PATENT DOCUMENTS

| | | | |
|---|---|---|---|
| 3,921,322 A * | 11/1975 | Sharp | .............................. 40/405 |
| 4,270,287 A | 6/1981 | Gimbel | |
| 4,391,053 A | 7/1983 | Anthony | |
| 4,991,336 A * | 2/1991 | Lucke | .............................. 40/630 |
| 5,379,929 A * | 1/1995 | Eskandry | ....................... 224/312 |
| 5,516,018 A * | 5/1996 | Eskandry | ....................... 224/312 |
| 5,611,590 A * | 3/1997 | Filgueiras | ..................... 296/97.5 |
| 5,653,364 A * | 8/1997 | Eskandry | ....................... 224/312 |
| 5,882,059 A * | 3/1999 | Romero | ....................... 296/97.6 |
| 5,887,773 A * | 3/1999 | Booth | ......................... 224/312 |
| 5,898,962 A * | 5/1999 | McNeal | ............................ 5/639 |
| 5,943,698 A * | 8/1999 | Blanks | ............................... 2/69 |
| 6,029,384 A | 2/2000 | McLaughlin | |
| 6,125,566 A | 10/2000 | McLaughlin | |
| 6,139,210 A * | 10/2000 | Nelson et al. | .................... 402/79 |
| 7,216,918 B1 | 5/2007 | Runfola | |
| 7,818,907 B1 * | 10/2010 | Warrington, Jr. | ............... 40/593 |
| 8,038,199 B2 * | 10/2011 | Marcus et al. | ................ 296/97.9 |
| 2002/0038959 A1 * | 4/2002 | Francis et al. | ................ 296/97.6 |
| 2003/0150149 A1 * | 8/2003 | Quick | ............................ 40/725 |
| 2006/0192404 A1 * | 8/2006 | Wieczorek et al. | ........... 296/97.1 |
| 2008/0190001 A1 * | 8/2008 | Gabbert | .......................... 40/781 |
| 2011/0252679 A1 * | 10/2011 | Shape et al. | .................... 40/721 |

\* cited by examiner

*Primary Examiner* — Shin Kim
(74) *Attorney, Agent, or Firm* — Daniel Boudwin; Global Intellectual Property Agency, LLC

(57) ABSTRACT

A picture frame display device is provided that can be detachably secured to the sun visor of an automobile. The front face of the device features at least two windows adapted to display 4"×6" photographs, artwork, or postcards. These windows are surrounded by a border of synthetic leather. Pictures are inserted into the window by means of an opening along the back of the device which is constructed of a rigid material covered with synthetic leather. A storage pocket is located on a side of the frame, lying between the front and back portions and is large enough to accommodate the storage of pictures not being displayed at the time. Elastic straps attached to the back of the device provide a means for securing the same to a sun visor.

8 Claims, 2 Drawing Sheets

AUTO PHOTO CADDY

CROSS REFERENCE TO RELATED APPLICATION

Figure 1:
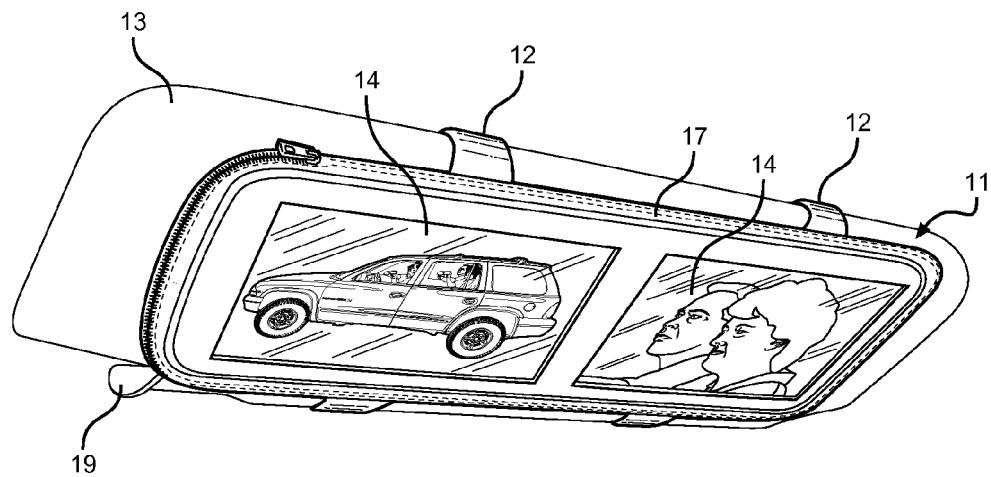

This application claims the benefit of U.S. Provisional Application No. 61/324,394 filed on Apr. 15, 2010, entitled "Auto Photo Caddy."

BACKGROUND OF THE INVENTION

1. Field of the Invention

The present invention relates to an automobile interior accessory. More particularly, the present invention relates to a picture frame attachable to an automobile sun visor for displaying personal photographs, artwork, or any other visual depiction.

For many years, automobile owners have found creative and sometimes unique ways of personalizing their vehicles. Individuals who find themselves in their automobiles for lengthy periods of travel or tedious daily commutes often desire to make the space around them feel warmer and more personable. Entire industries have been built around the production of witty bumper stickers, sports team flags, antenna tassels, decorative air fresheners, and dash mounted bobble figures. These decorations may make an automobile more comfortable or inviting for the automobile driver by evoking amusement, nostalgia, contentment, or any number of pleasant feelings.

Aside from manufactured decorations, automobile owners may desire to use photographs, artwork, or postcards to personalize their vehicle interiors. Photographs of loved ones, vacation spots, and pets are commonly posted to dashboards, visors, and other interior surfaces for the viewing enjoyment of drivers and passengers. These photographs or pieces of art remind the viewer of places and people the viewer is fond of, creating a more pleasurable traveling environment.

Several methods of automobile picture display have developed over the years. Some display a picture in a frame that can be attached to a dashboard by adhesive, which can be difficult to remove or lead to sticky residue on or discoloration of the dash surface. Other methods utilize a picture frame held onto a vehicle interior feature by clips, but these can detach at inopportune times if the flips become damaged or weakened by age. Lastly, some methods simply put adhesive or clips on the picture itself to attach it to a vehicle interior feature. None of these methods addresses a user's desire to have additional pictures available, so that the displayed image may be changed easily while the individual is in transit.

2. Description of the Prior Art

The prior art contains a variety of automobile picture display devices for display of images on an automobile sun visor. These devices have familiar design and structural elements for the purposes of photo display in an automobile; however they are not adapted for the task of storing additional images.

Gimbel, U.S. Pat. No. 4,270,287 discloses a picture frame picture holder that can display a single photograph and is permanently affixable to an automobile feature.

Anthony, U.S. Pat. No. 4,391,053 discloses an automobile picture display device detachably affixed to a vehicle sun visor by metal clips, and capable of displaying a plurality of photos.

McLaughlin, U.S. Pat. No. 6,029,384 discloses an automobile picture display device that can display a single picture and is affixed to an automobile ventilation grill by means of a U-shaped clip.

McLaughlin, U.S. Pat. No. 6,125,566 discloses an automobile picture display device and method for displaying a single picture that is removably affixed to an automobile ventilation grill by means of a U-shaped clip.

Runfola, U.S. Pat. No. 7,216,918 discloses an automobile accessory device comprising flaps that display art, advertisements, or indicia and attaches to a vehicle sun visor by an elastic sleeve.

The devices disclosed by the prior art do not address the need for storage of pictures, artwork, or postcards that a user may wish to display at a later time. The current invention relates to a device for automobile photograph display that allows a user to display multiple images at one time, and store other images in a side pocket for later use. It substantially diverges in design elements from the prior art, consequently it is clear that there is a need in the art for an improvement to the existing picture display devices for automobiles. In this regard the instant invention substantially fulfills these needs.

SUMMARY OF THE INVENTION

In view of the foregoing disadvantages inherent in the known types of automobile picture display devices now present in the prior art, the present invention provides a new storage means wherein the same can be utilized for providing convenience for the user when displaying and storing photographs, artwork, or postcards. The picture display device of the present invention contains a frame assembly that can be removably secured to an automobile sun visor. The frame is oval in shape and comprises a front face and a back portion. There is a plurality of clear windows on its front face for displaying images. These windows are of size suitable for displaying 4"×6" photographs or images. An opening in the back of the frame assembly provides a means for images to be inserted and removed into the display device. The back of the frame is constructed of a thin, rigid backing material to protect images from bending or distortion.

Located between the front face and the back panel of the picture display device, on its side, is a zippered storage cavity. Images such as photographs, artwork, or postcards that an automobile user may want to display at some point, or has previously displayed, may be stored in the zippered enclosure. Storage of images in the enclosed cavity protects them from being damaged by other objects in the vehicle. The display device is removably attached to a vehicle's sun visor by sliding the sun visor through two straps attached to the back of the frame assembly. Elastic straps allow the picture display device to be used with a variety of differently sized sun visors.

It is therefore an object of the present invention to provide a new and improved automobile picture display device that has all of the advantages of the prior art and none of the disadvantages.

Another object of the present invention is to provide a new and improved automobile picture display device that contains zippered storage cavity for securely storing photograph, artwork, or postcards, which are not being displayed at the time.

Yet another object of the present invention is to provide a new and improved automobile picture display device that has multiple windows on its front face for displaying a plurality of images.

Still another object of the present invention is to provide a new and improved automobile picture display device that removably attaches to a vehicle sun visor by elastic straps to promote convenience of device insertion and removal.

Another object of the present invention is to provide a new and improved automobile picture display device that is has resilient and durable construction.

Other objects, features and advantages of the present invention will become apparent from the following detailed description taken in conjunction with the accompanying drawings.

BRIEF DESCRIPTIONS OF THE DRAWINGS

The above invention will be better understood and the objects set forth above as well as other objects not stated above will become more apparent after a study of the following detailed description thereof. Such description makes use of annexed drawings wherein:

FIG. 1 shown is a perspective view of the front face of the preferred embodiment of the present invention.

Figure 2:
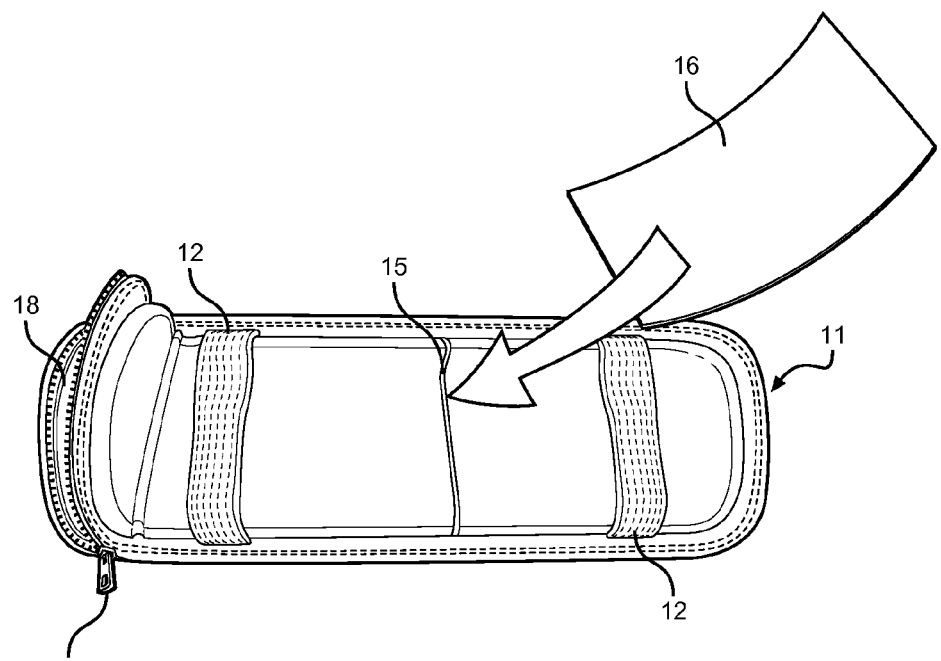

FIG. 2 shown is the back portion of the preferred embodiment of the present invention with an image being inserted into the opening. A side-mounted zipper enclosure is open and folded back to display a storage cavity.

Figure 3:
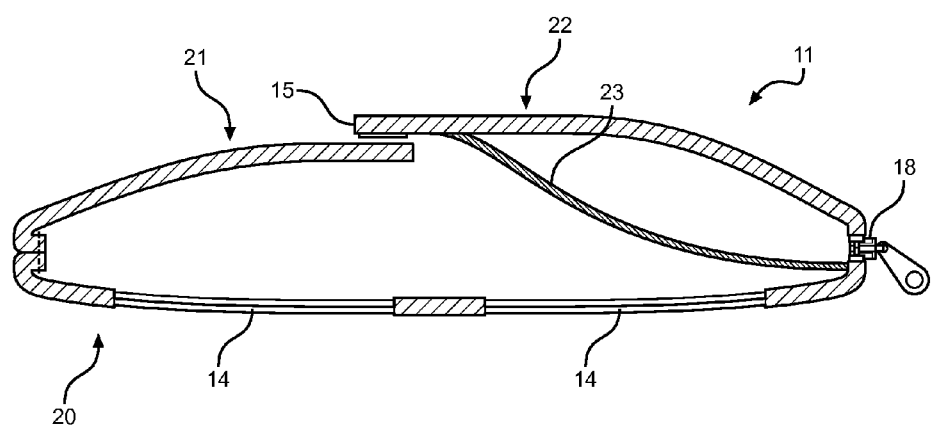

FIG. 3 shows an overhead cross-section slice of the photo storage device of the present invention.

DETAILED DESCRIPTION OF THE INVENTION

Reference is made herein to the attached drawings. Like reference numerals are used throughout the drawings to depict like or similar elements of the claimed automobile picture display device. For the purposes of presenting a brief and clear description of the present invention, the preferred embodiment will be discussed as used for displaying images on a vehicle's sun visor. This is for illustrative purposes only and should not be considered to be limiting in any respect.

Referring now to FIGS. 1 & 2, there is shown an embodiment of the present invention for an automobile picture display device that is removably attachable to a vehicle sun visor. The picture display device comprises an oval shaped frame assembly 11 and a securing means 12 for attaching the picture holder to a sun visor 13. Frame assembly 11 portions consist of a front face having at least two windows 14, a back portion having an open slot 15 for receiving images 16, and a storage pocket 18 there-between.

The front portion of the frame assembly 11 contains at least two windows 14 through which photographs, artwork, or postcards may be viewed. Images of 4"×6" size or smaller may be accommodated by each window 14. These viewing windows 14 may be constructed of any durable, clear material such as vinyl or plastic. Surrounding the viewing windows 14 is a border of material that extends to the perimeter of the oval shaped frame assembly 11, creating an aesthetically appealing frame for the images displayed in the viewing windows 14. The front portion is joined to the back portion at their respective perimeters, forming an interior cavity between the two portions. Items placed within the cavity are viewable through the front portion windows and are held in place by the back portion. To support images being displayed, the back portion of the frame assembly 11 contains a thin, rigid backing material such as card stock or plastic, which is covered in the same aesthetically appealing material as the front face. Use of rigid reinforcement in the back portion of the frame assembly 11 reduces the potential for bent or distorted pictures. An opening 15 in the back allows pictures 16 to be inserted and removed from the interior cavity of the frame assembly 11. Once a photograph, postcard, or piece of art is removed from the viewing windows 14 it may be safely held within the storage pocket 18 located on either end of the frame assembly 11. The storage pocket extends into the interior cavity of the device creating a chamber within the cavity that is accessible only via the side closure. Thus, the side opening provides access to the storage pocket, but not the interior cavity, and the slit in the back portion provides access to the interior cavity, but not the storage pocket. This pocket 18 does not have specific dimensions but should be sized to adequately accommodate a 4"×6" photograph within its enclosure. The storage pocket can be opened or closed by means of a fastener such as a zipper 19 or hook and loop fasteners. Around the perimeter of the frame assembly 11, a one-inch strip 17 of durable material such as plastic is used to secure the front and back portions together.

The securing means 12 comprises two or more elastic straps fixedly attached to the back of the frame assembly 11. A sun visor 13 may be inserted between the straps 11 and the frame assembly 11 to secure the device to that visor 13. The device may be constructed of any number of aesthetically pleasing and durable materials such as synthetic leather, real leather, plastic, or other synthetic materials. It is not contemplated that all elements of the frame assembly 11 must be constructed of the same materials or be the same color.

Turning now to FIG. 3 there is shown an overhead cross-section slice of the auto photo caddy. The frame assembly 11 has a front portion 20 with two or more translucent windows 14; a back portion having a slit 15 that divides the section into a first back section 21 and a second back section 22. A storage pocket 23 extends between the front and back portions into the intermediate interior cavity. The pocket entrance is the side opening having a zipper 18 or other fastener. To prevent obstruction of photos inserted through the slit, the storage pocket extends to but does not pass the slit. In this way, photos inserted through the slit in the back portion are visible through the window.

In use an individual unfastens the zipper 19 of the storage pocket 18, removes two pictures 16, and closes the storage pocket 18. The user then inserts same pictures 16 into the opening 15 on the back of the frame assembly 11. Once the pictures 16 are positioned within the viewing windows 14 according to the user's liking, the user secures the device to his or her sun visor 13. The device is secured to a user's visor 13 by positioning the device so that the front faces the user; the visor 13 is inserted between the frame assembly 11 and the elastic straps 12 to secure the assembly. A user may adjust positioning of the frame assembly 11 and the sun visor 13 as necessary to suit his or her viewing needs.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automobile accessory for displaying images on a vehicle sun visor, comprising:

an oval shaped frame assembly having a front face, a back portion, wherein said front face is joined to said back face along a shared perimeter forming an interior cavity therebetween, and having an opening on one side providing access to a storage pocket located within said interior cavity;

said front face comprising a plurality of windows adapted to display images, and said back portion having an opening adapted to receive images into said interior cavity of said frame assembly;

wherein items said interior cavity is accessible only via said opening in said back portion and wherein said storage pocket is accessible only via said opening in said shared perimeter;

said storage pocket extends substantially to, but not past said opening in said back portion so as not to obstruct access to said interior cavity via said opening in said back portion;

said storage pocket is positioned within said interior cavity on either side edge of the device, said pocket being adapted to securely hold images, and is opened or closed by a fastening means;

a securing means attached to said back portion of said frame assembly for removably attaching to a sun visor.

2. The picture display device of claim 1, wherein said windows are made of vinyl.

3. The picture display device of claim 1, wherein said back portion is made of a rigid material such as card stock.

4. The picture display device of claim 1, wherein said fastening means is a zipper.

5. The picture display device of claim 1, wherein said fastening means is hook and loop fasteners.

6. The picture display device of claim 1, wherein said securing means being a plurality of elastic straps.

7. The picture display device of claim 1, wherein said device is constructed of leather.

8. The picture display device of claim 1, wherein said images being 4×6 inch photographs.

* * * * *